United States Patent [19]
Ooki et al.

[11] Patent Number: 5,694,220
[45] Date of Patent: Dec. 2, 1997

[54] MINUTE STEP MEASURING METHOD

[75] Inventors: Hiroshi Ooki; Yutaka Iwasaki; Jun Iwasaki, all of Yokohama, Japan

[73] Assignee: Nikon Corporation, Tokyo, Japan

[21] Appl. No.: 540,455

[22] Filed: Oct. 10, 1995

[30] Foreign Application Priority Data

Oct. 20, 1994 [JP] Japan ................... 6-255159

[51] Int. Cl.[6] .............................................. G01B 11/00
[52] U.S. Cl. ...................... 356/376; 356/4.01; 356/359
[58] Field of Search ................................. 356/376, 372, 356/375, 378, 381, 382, 345, 346, 355, 357, 4.01, 359; 359/370

[56] References Cited

U.S. PATENT DOCUMENTS

| | | | |
|---|---|---|---|
| 4,679,941 | 7/1987 | Fujita | 356/384 |
| 4,770,532 | 9/1988 | Ito | 356/376 |
| 4,900,940 | 2/1990 | Nakamura | 356/376 |
| 5,087,121 | 2/1992 | Kakuchi et al. | 356/73 |
| 5,315,373 | 5/1994 | Kubo et al. | 356/376 |
| 5,581,345 | 12/1996 | Oki et al. | 356/4.01 |

FOREIGN PATENT DOCUMENTS

| | | |
|---|---|---|
| 0 489 580 | 6/1992 | European Pat. Off. |
| 0 611 946 | 8/1994 | European Pat. Off. |
| 4-208913 | 7/1992 | Japan |
| 6-241736 | 9/1994 | Japan |

OTHER PUBLICATIONS

Ooki, Hiroshi et al, "A novel type of laser scanning microscope: theoretical considerations", *Optics Communications*, vol. 85, No. 2, 3, Sep., 1991 pp. 177–182.

Ooki, Hiroshi et al, "A Novel Super Resolution Technique for High–Density Optical Data Storage Using Mode Interference in Channel Waveguides", *Japanese Journal of Applied Physics*, vol. 32, Part 1, No. 4, Apr. 1993, pp. 1668–1671.

Ooki, Hiroshi et al, "Laser Scanning Mode Interference Contrast Microscope and Its Application to Step Height Measurement", *Japanese Journal of Applied Physics*, vol. 32, Part 1, No. 11A, Nov., 1993, pp. 4998–5001.

Arimoto, Rieko et al, "Laser Scanning Mode Interference Contrast Microscope", *Contemporary Optics & Optics Design*, Oct. 21, 1994, pp. 40–45 (in Japanese with English translation).

Jungerman, R.L. et al., "Phase Sensitive Scanning Optical Microscope," *Applied Physics Letters;* vol. 45, No. 8, Oct. 1984; pp. 846–848.

*Primary Examiner*—Hoa Q. Pham
*Attorney, Agent, or Firm*—Shapiro and Shapiro

[57] ABSTRACT

A minute step measuring method comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference and a signal of a sum between two signals according to the two light beams detected, wherein measurement is conducted of a signal $W_a$ of the sum when the laser spot is located on one of two flat portions existing before and after the step, and of a signal $W_b$ of the sum when the laser spot is located on the other flat portion, and wherein the step is measured by correcting a difference between reflectivities of the two flat portions existing before and after the step in measuring the minute step, using the signals $W_a$ and $W_b$.

8 Claims, 4 Drawing Sheets

MINUTE STEP MEASURING METHOD

BACKGROUND OF THE INVENTION

1. Field of the Invention

The present invention relates to a minute step measuring method for measuring a minute step on an object to be measured.

2. Related Background Art

Scanning electron microscopes and stylus (contact probe) type measuring apparatus are often used in measurement of a minute step of the nanometer order existing on an object. In addition, atomic force microscopes are being used for that purpose.

However, the scanning electron microscopes and atomic force microscopes are expensive and difficult to handle, and the contact probe type apparatus has a problem of damaging the object. The present inventors disclosed a method and apparatus for measuring a minute step, utilizing a laser scanning mode interference contrast (LASMIC) microscope in the bulletin of Japanese Patent Application Laid-open No. 6-241736.

This method is, however, based on such assumptions that the step on the object is sufficiently smaller than the wavelengths of light and that the object has no change in reflectivity of light between regions before and after the step, which imposed a restriction on measurable steps.

SUMMARY OF THE INVENTION

The present invention has been accomplished taking account of the above problems, and an object of the invention is to provide a minute step measuring method capable of expanding the range of dimensions of measurable steps and capable of accurately measuring a step on an object with changing reflectivities of light on either side of the step to be measured.

The present invention thus provides a first minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using at least one of a signal of a difference and a signal of a sum between two signals according to the two light beams detected, wherein measurement is conducted of a signal $W_a$ of the sum when the laser spot is located on one of two flat portions existing before and after the step, and of a signal $W_b$ of the sum when the laser spot is located on the other flat portion, and wherein the step is measured by correcting a difference between reflectivities of the two flat portions existing before and after the step in measuring the minute step, using the signals $W_a$ and $W_b$.

The present invention also provides a second minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference and a signal of a sum between two signals according to the two light beams detected, wherein when $W_a$ is a signal of the sum when the laser spot is located on one of flat portions existing before and after the step, $W_b$ a signal of the sum when the laser spot is located on the other flat portion, W a signal of the sum when the center of the laser spot becomes coincident with the center of the step, S a signal of the difference, and R a constant determined depending upon a device, the step is measured based on a phase difference $\phi$ obtained by the following equation.

$$\sin\phi = \frac{1}{R} \frac{S}{\sqrt{W_a}\sqrt{W_b}}$$

The present invention also provides a third minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference and a signal of a sum between two signals according to the two light beams detected, wherein when $W_a$ is a signal of the sum when the laser spot is located on one of flat portions existing before and after the step, $W_b$ a signal of the sum when the laser spot is located on the other flat portion, W a signal of the sum when the center of the laser spot becomes coincident with the center of the step, and R a constant determined depending upon a device, the step is measured based on a phase difference $\phi$ obtained by the following equation.

$$\cos\phi = \frac{4W - (W_a + W_b)(1 + R^2)}{2\sqrt{W_a}\sqrt{W_b}(1 - R^2)}$$

The present invention also provides a fourth minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference and a signal of a sum between two signals according to the two light beams detected, wherein when $W_a$ is a signal of the sum when the laser spot is located on one of flat portions existing before and after the step, $W_b$ a signal of the sum when the laser spot is located on the other flat portion, W a signal of the sum when the center of the laser spot becomes coincident with the center of the step, S a signal of the difference, and R a constant determined by a device, the step is measured based on a phase difference $\phi$ obtained by the following equations.

$$\sin\phi = \frac{1}{R} \frac{S}{\sqrt{W_a}\sqrt{W_b}}$$

and $$\cos\phi = \frac{4W - (W_a + W_b)(1 + R^2)}{2\sqrt{W_a}\sqrt{W_b}(1 - R^2)}$$

The present invention also provides a fifth minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference between two signals according to the two light beams detected, wherein the laser spot is formed on the object so that the center of the laser spot is located at the center of the step, a phase difference is changed between an even mode and an add mode excited in the double-mode waveguide, and the step is measured based on a change amount of the phase difference between the even mode and the odd mode when an absolute value of an output of the signal of the difference becomes maximum or minimum.

The present invention also provides a sixth minute step measuring method which comprises forming a laser spot on an object by condensing light from a laser light source, condensing light beams from the object on an end face of a double-mode waveguide, branching light propagating in the double-mode waveguide into two channel waveguides, detecting light beams emerging from the two channel waveguides, and measuring a minute step existing on the object, using a signal of a difference between two signals according to the two light beams detected, wherein said double-mode waveguide has an electrooptic effect, and wherein the laser spot is formed on the object so that the center of the laser spot is located at the center of the step, an electric field is applied to the double-mode waveguide so that an absolute value of an output of the signal of the difference becomes maximum or minimum, and the step is measured based on a value of the electric field which makes the absolute value of the output of the signal of the difference maximum or minimum.

The present inventors have already presented the principle of detection as to the LASMIC microscope utilizing the waveguide (Optics Communications 85 (1991) 177, Japanese Journal of Applied Physics 32 (1993) 4998), and here is explained a quantitative relation between the step on the object and an image signal. For simplicity, this relation is restricted to one-dimension, but a two-dimensional model can also be handled by introducing orthogonal coordinate axes to equations. In addition, since the introduction of the orthogonal coordinate axes does not affect equations (19) to (21), which are final results of equations as detailed later, one-dimensional analysis suffices. The essence of the present invention is to find out the quantitative relation and to measure the step on the object using the quantitative relation.

Let us take a coordinate axis s on the surface of the object and define an amplitude distribution o(s) of the object as follows. Here the origin of the coordinate axis s is set at a step portion to be measured.

$$o(s) = \begin{cases} a & -\infty < s < 0 \\ b \exp[i\phi] & 0 < s < \infty \end{cases} \quad (1)$$

Here, letting v(x, t) be an amplitude distribution of a light spot reflected by the object, at an entrance end face of a channel waveguide, v(x, t) is given by the following equation.

$$v(x,t) = \int_{-\infty}^{\infty} o(s)u(s-x)K(s-x-t)ds \quad (2)$$

In the above equation, u(x) is an amplitude distribution of a laser spot illuminating the object, K(t) an amplitude spread function of an imaging optical system from the object to the entrance end face of the channel waveguide, x a distance from the origin of the coordinate s on the surface of the object to the center of the laser spot formed on the object, and t a coordinate axis on the entrance end face of the channel waveguide. Here, the coordinate axis t is parallel with the coordinate axis s, and the origin of the coordinate axis t is at the center of the double-mode waveguide. Here, let $C_0(x)$, $C_1(x)$ be coupling coefficients of the laser spot formed on the end face of waveguide with the even and odd modes, respectively, of the double-mode waveguide, which are given as follows.

$$C_{0,1}(x) = \int_{-\infty}^{\infty} v(x,t) f_{0,1}(t) dt \quad (3)$$

In the above equation, $f_0(t)$, $f_1(t)$ are field distribution functions of the even and odd modes of the double-mode waveguide. Substituting equations (1) and (2) and x=0 into equation (3), the following equations are obtained.

$$C_0(0) = (a+b \cos \phi + ib \sin \phi)A \quad (4)$$

$$C_1(0) = (a-b \cos \phi - ib \sin \phi)B \quad (5)$$

Here, A and B are given as follows.

$$A = \int_{-\infty}^{0} ds \int_{-\infty}^{\infty} u(s)K(s-t)f_0(t)dt \quad (6)$$

$$B = \int_{-\infty}^{0} ds \int_{-\infty}^{\infty} u(s)K(s-t)f_1(t)dt \quad (7)$$

When x=0, a light intensity distribution I(0, t) appearing in the double-mode waveguide is given by the following equation with a phase difference θ between the even and odd modes.

$$I(0, t) = |C_0(0)f_0(t) + \exp[i\theta]C_1(0)f_1(t)|^2 \quad (8)$$

Here, the double-mode waveguide is split by a waveguide branch into two paths, which become two parallel channel waveguides. Mode conversion losses can be ignored if curves of the waveguides are sufficiently small at the branch point. Thus, the even and odd modes $f_0(t)$, $f_1(t)$ excited in the double-mode waveguide are correspondently coupled with the even and odd modes of a combinational waveguide composed of the two channel waveguides after branching. Letting $g_0(t)$, $g_1(t)$ be field distribution functions of the even and odd modes of the combinational waveguide, the following relations hold because the two waveguides are sufficiently apart from each other on the end face of the waveguide substrate on the photodetector side.

$$g_0(t) = \begin{cases} -g_1(t) & -\infty < t < 0 \\ g_1(t) & 0 < t < \infty \end{cases} \quad (9)$$

Incidentally, the aforementioned reference already disclosed the fact that in measuring spatial phase information of light incident to the double-mode waveguide, the optimal condition is given when the phase difference between the even and odd modes becomes θ=π/2+mπ(m=0, 1, 2, ... ). Accordingly, putting 90° into θ in equation (8) and considering equation (9) and the above discussion, I(0, t) becomes as follows.

$$I(0,t) = \begin{cases} iC_0(0)\,g_0(t) - iC_1(0)\,g_0(t)^2 & -\infty < t < 0 \\ iC_0(0)\,g_0(t) + iC_1(0)\,g_0(t)^2 & 0 < t < \infty \end{cases} \quad (10)$$

At this time, the light intensity distribution I(0, t) of equation (10) represents light intensity distributions of light beams emerging from the two channel waveguides connected to the double-mode waveguide. Thus, detecting the light beams emerging from the two channel waveguides by respective light-receiving elements and letting S be a difference between them and W be a sum of them, they are given as follows.

$$S = 8abABD \sin\phi \quad (11)$$

$$W = \{2(a^2+b^2)(A^2+B^2)+4ab(A^2-B^2)\cos\phi\}D \quad (12)$$

In the above equations, D is given as follows.

$$\int_0^\infty \{g_0(t)\}^2 dt = \int_{-\infty}^0 \{g_0(t)\}^2 dt = D \quad (13)$$

The signals S, W are those obtained when the center of the laser spot formed on the object is located at the center of the step. Then let us consider signals at flat portions before and after the step on the object in order to take account of reflectivities changing depending upon positions before and after the step on the object. In this case the amplitude distribution o(s) of the object can be redefined as follows.

$$o(s) = p \quad (14)$$

Here, the value of p in equation (14) is a before the step or b on the opposite side in correspondence to equation (1). Applying the same discussion used in the derivation of equations (11), (12), a sum signal $W_p$ in this case is obtained as follows.

$$W_p = 8p^2 A^2 D \quad (15)$$

Accordingly, a sum signal $W_a$ before the step and a sum signal $W_b$ on the opposite side are as follows.

$$W_a = 8a^2 A^2 D \quad (16)$$

$$W_b = 8b^2 A^2 D \quad (17)$$

From equations (11), (12), (16), (17), using $$R = B/A \quad (18)$$

the following relations are obtained.

$$\sin\phi = \frac{1}{R} \frac{S}{\sqrt{W_a}\sqrt{W_b}} \quad (19)$$

$$\cos\phi = \frac{4W - (W_a + W_b)(1 + R^2)}{2\sqrt{W_a}\sqrt{W_b}(1 - R^2)} \quad (20)$$

Therefore, the phase difference φ of light due to the step can be directly obtained from equation (19) or equation (20) using the appropriate ones of the signals S, W, $W_a$, $W_b$. Here R is a device constant, which is obtained from equations (6), (7), (18) in the one-dimensional consideration. However, if the device constant R is empirically obtained by preliminarily measuring an object with a known step and a known reflectivity, it is given as a value applicable to general two-dimensional cases. Since this phase difference φ is a value according to the step on the object, the minute step on the object can be obtained by obtaining the phase difference φ. Values of sinφ and cosφ change with a change of the phase difference φ. With values of φ close to 0 (or with minute step heights of the object), the values of sinφ change faster than those of cosφ. It is thus preferable that equation (19) be used in order to raise the measurement accuracy. It is also preferable that equation (20) be also used in the cases where an accurate value of the phase difference φ cannot be determined only by a value of sinφ [equation (19)].

Let us next consider another method for measuring a minute step according to the present invention. When the laser spot is at the center of the step, the amplitudes of the even and odd modes excited in the double-mode waveguide are given by equations (4) and (5). Accordingly, a phase difference α between the two modes is given by an argument of a complex number $C_0(0)/C_1(0)$, thus obtaining the following relation.

$$\tan\alpha = \frac{2ab\sin\phi}{a^2 - b^2} \quad (21)$$

Namely, a tangent of α is proportional to a sine of the phase difference of light, sinφ. When the phase difference between the even and odd modes becomes mπ (where m is an integer) at the exit of the two channel waveguides, the difference signal, i.e. the contrast of a mode interference image, becomes maximum. Accordingly, if the length of the double-mode waveguide is set to a length suitable for detecting a phase object and if the phase difference between the even and odd modes is adjusted so as to maximize the contrast of the mode interference image (a light intensity of a difference between the light beams emerging from the two channel waveguides), the phase difference φ of light due to the step can be obtained by an amount of the adjustment at that time. Similarly, if the phase difference between the even and odd modes is adjusted so as to minimize the contrast of mode interference image, the phase difference φ of light due to the step can also be obtained by an amount of the adjustment. As described above, since this phase difference φ is a value according to the step on the object, the minute step on the object can be obtained when the phase difference φ is obtained. The phase difference between the even and odd modes can be adjusted by, for example, such an arrangement that electrodes are mounted on a double-mode region and a voltage is applied to the electrodes. Of course, the channel waveguide substrate needs to have an electrooptic effect, for example. Alternatively, a magnetooptic effect or a thermooptic effect may be employed in order to adjust the phase difference between the even and odd modes.

The above and other objects, features and advantages of the present invention will be explained hereinafter and may be better understood by reference to the drawings and the following description.

DETAILED DESCRIPTION OF THE PREFERRED EMBODIMENTS

The present invention will be explained in further detail with regard to preferred embodiments thereof, but it should be noted that the present invention is by no means intended to be limited to those embodiments.

Figure 1:
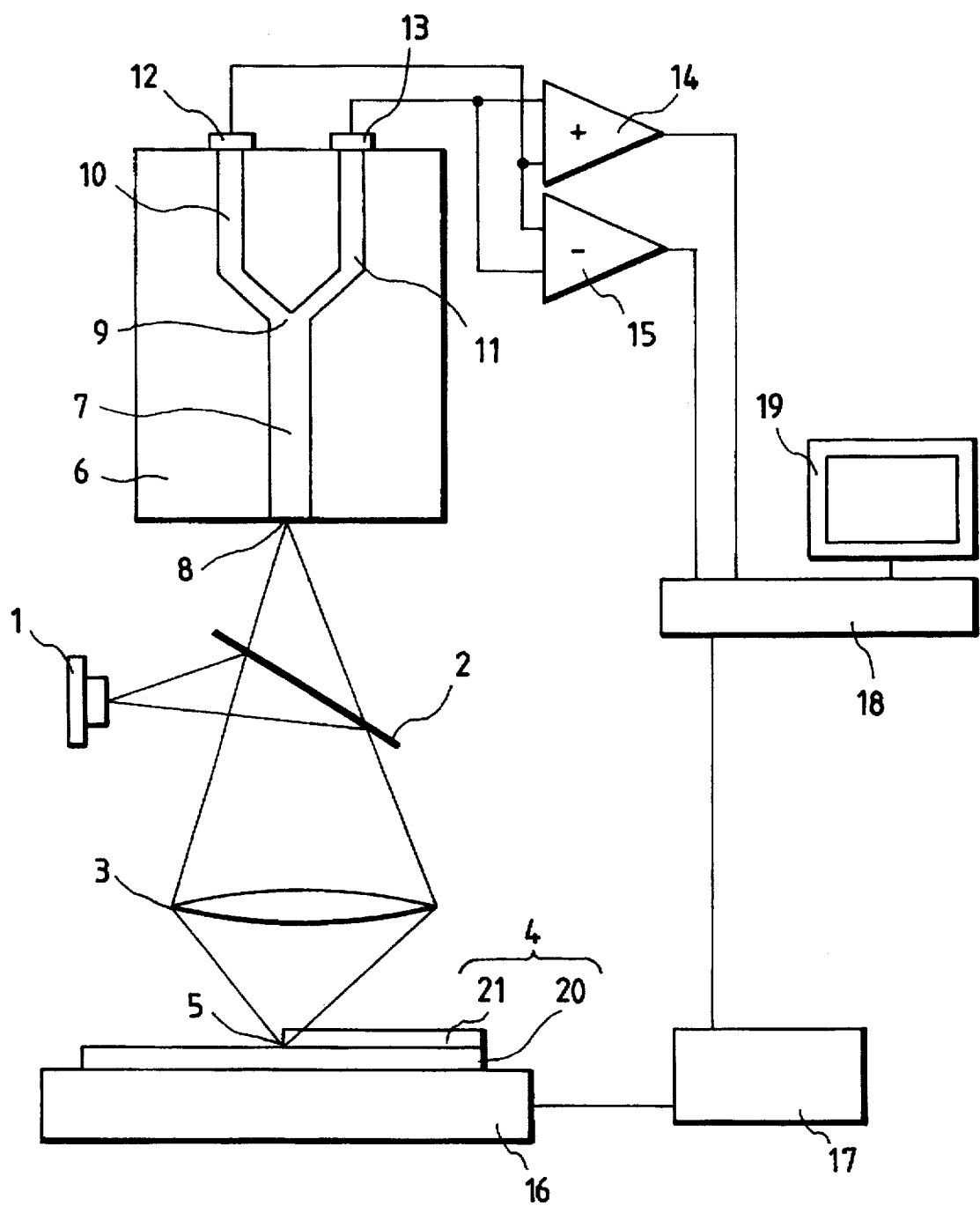
FIG. 1 is a schematic structural drawing to show a step measuring apparatus according to a first embodiment of the present invention.

FIG. 1 is a schematic structural diagram to show a minute step measuring apparatus according to the first embodiment of the present invention.

Laser light emitted from a laser light source 1 travels via a half mirror 2 and an objective lens 3 to form a laser spot 5 on an object 4 to be measured. Return light from the object 4 again travels via the objective lens 3 and the half mirror 2 to enter an entrance end face 8 (detection surface) of a double-mode channel waveguide 7 formed on a substrate 6. The light entering the entrance end face 8 propagates in the double-mode channel waveguide 7 and then is distributed into two channel waveguides 10, 11 at a waveguide branch region 9. Light beams distributed into the two channel waveguides 10, 11 impinge on respective photodetectors 12, 13 provided to detect intensities thereof. Outputs from the photodetectors 12, 13 are input into an adder 14 and a subtractor 15 to yield a sum signal and a difference signal respectively. The object 4 is fixed on an X-Y movable stage 16, and the X-Y movable stage 16 is arranged so as to be capable of moving the object 4 relative to the light spot 5 by a known amount according to a control signal from a controller 17. A computer 18 performs mathematical processing to obtain the phase difference $\phi$ using equations (19) and (20) from the outputs from the adder 14 and subtractor 15, corresponding to a position signal of the X-Y movable stage 16 obtained from the controller 17, and the device constant preliminarily obtained. The computer calculates a step height of a step on the object, based on the value of $\phi$ obtained from the mathematical processing, forms a graph of the result, and outputs the graph of the result with a scale. A display unit 19 shows a two-dimensional display of the step on the object, based on an output signal from the computer 18.

The object 4 in the first embodiment is one obtained by patterning of a gold pattern 21 on a Si substrate 20. With the wavelength 0.6328 μm of the laser light source 1 used in the first embodiment, reflectivities of Si substrate 20 and gold pattern 21 were 33% and 87%, respectively, for normal incidence.

In the first embodiment, the double-mode channel waveguide 7 and the two channel waveguides 10, 11 were fabricated by patterning and thermal diffusion of a metal, titanium, on a lithium niobate substrate 6 by conventional methods. At this time, the length of the double-mode channel waveguide 7 was determined so that the phase difference between the even mode and the odd mode of light emerging from the two channel waveguides 10, 11 became 90° when light with equal phase and amplitude was incident into the double-mode channel waveguide 7.

Figure 2A:
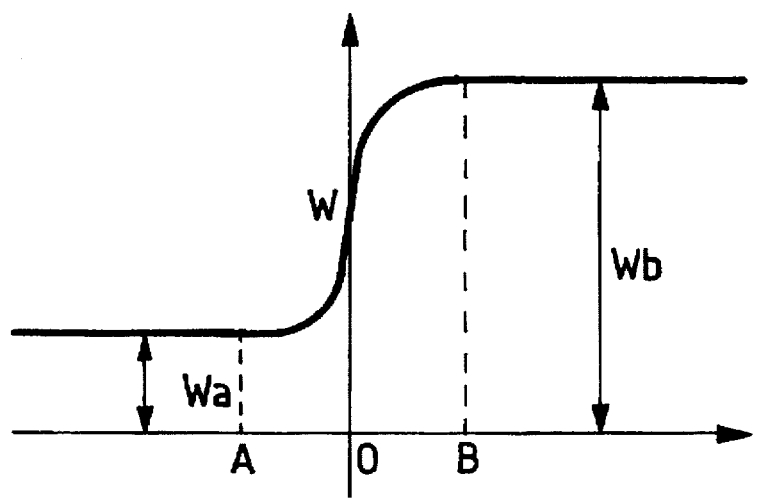
FIG. 2A and FIG. 2B are explanatory drawings to show a sum output signal and a difference output signal, respectively, obtained by the step measuring apparatus according to the first embodiment of the present invention.
Figure 2B:
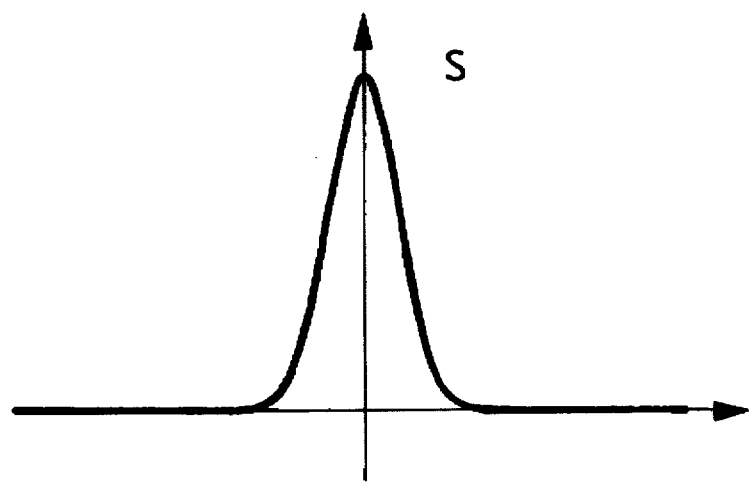

FIGS. 2A and 2B show output signals from the adder 14 and the subtractor 15, respectively, obtained when the X-Y movable stage 16 was moved so that the light spot 5 traverses a step structure on the object 4, using the above step measuring apparatus. The ordinate represents the magnitude of the output signals and the abscissa represents the relative distance between the position of the step structure and the position of the light spot 5 on the object 4.

The computer 18 determines the parameters $W_a$, $W_b$, and W in the equations (19) and (20) from the curve of FIG. 2A, and determines S in equation (19) from the curve of FIG. 2B.

Further, a height h of the step structure was obtained using the device constant R, preliminarily obtained with a plurality of step samples, and the thus obtained parameters $W_a$, $W_b$, W and S. As a result, the height h was obtained as 157 nm.

The first embodiment is arranged to measure the step from the phase difference $\phi$. A phase difference of light will also result from an object with planes made of two types of substances. Therefore, the step measuring apparatus according to the first embodiment can measure the type of substance. In the first embodiment the step of the object was measured assuming there was no phase difference of substance before and after the step on the object, but if there is a difference in phase lump amount etc. due to a difference in complex index of refraction before and after the step, it is preferred that the step on the object be measured taking account of the phase jump amount etc. before and after the step.

The overall configuration of the first embodiment is substantially the same as that of the LASMIC microscope disclosed in the bulletin of Japanese Patent Application Laid-open No. 4-208913, but in the case of use as a minute step measuring apparatus, the apparatus does not have to be constructed in the configuration of a microscope. In that case, for example, the device for displaying two-dimensional images or the two-dimensional movable stage can be omitted. In this case, the movable stage may be one one-dimensionally movable. Although the first embodiment used the X-Y movable stage for relatively moving the object with respect to the laser spot formed on the object, the laser spot may be arranged to move, for example using a polygon mirror or the like, instead of moving the object.

In order to determine the length of the double-mode channel waveguide 7 so that the phase difference between the even mode and the odd mode becomes 90° at the exit of the double-mode channel waveguide 7, the length L of the double-mode region (where light propagating in the waveguide propagates in the double modes) may be any length selected from those expressed by L=Lc (m+½) (m=0, 1, 2, ... ) where Lc is a fully coupled length (the length which makes the phase difference equal to K between light in the even mode and light in the odd mode).

The first embodiment was arranged to obtain $W_a$, $W_b$, W after obtaining the output from the adder 14, as shown in FIG. 2A, but they can be attained by obtaining only outputs from the adder at least at three points, the regions where the center of the light spot is located before and after the step and the region where the center of the light spot is located at the step. For example, $W_a$, $W_b$, W can be obtained by obtaining three outputs from the adder at points A, B, 0 in FIG. 2A. It is of course possible to apply the technique of eliminating the influence due to the change of reflectivities before and after the step, by measuring signals at least at three points in the step region and regions before and after the step, to the conventional minute step measuring apparatus as disclosed for example in the bulletin of Japanese Patent Application Laid-open No. 6-241736.

The first embodiment was described as one to obtain the actual height of the object, but it is also possible to measure a relative step (relative height) of the object, such as by monitoring the magnitude of $\phi$, which is a value according to the step height.

Figure 3:
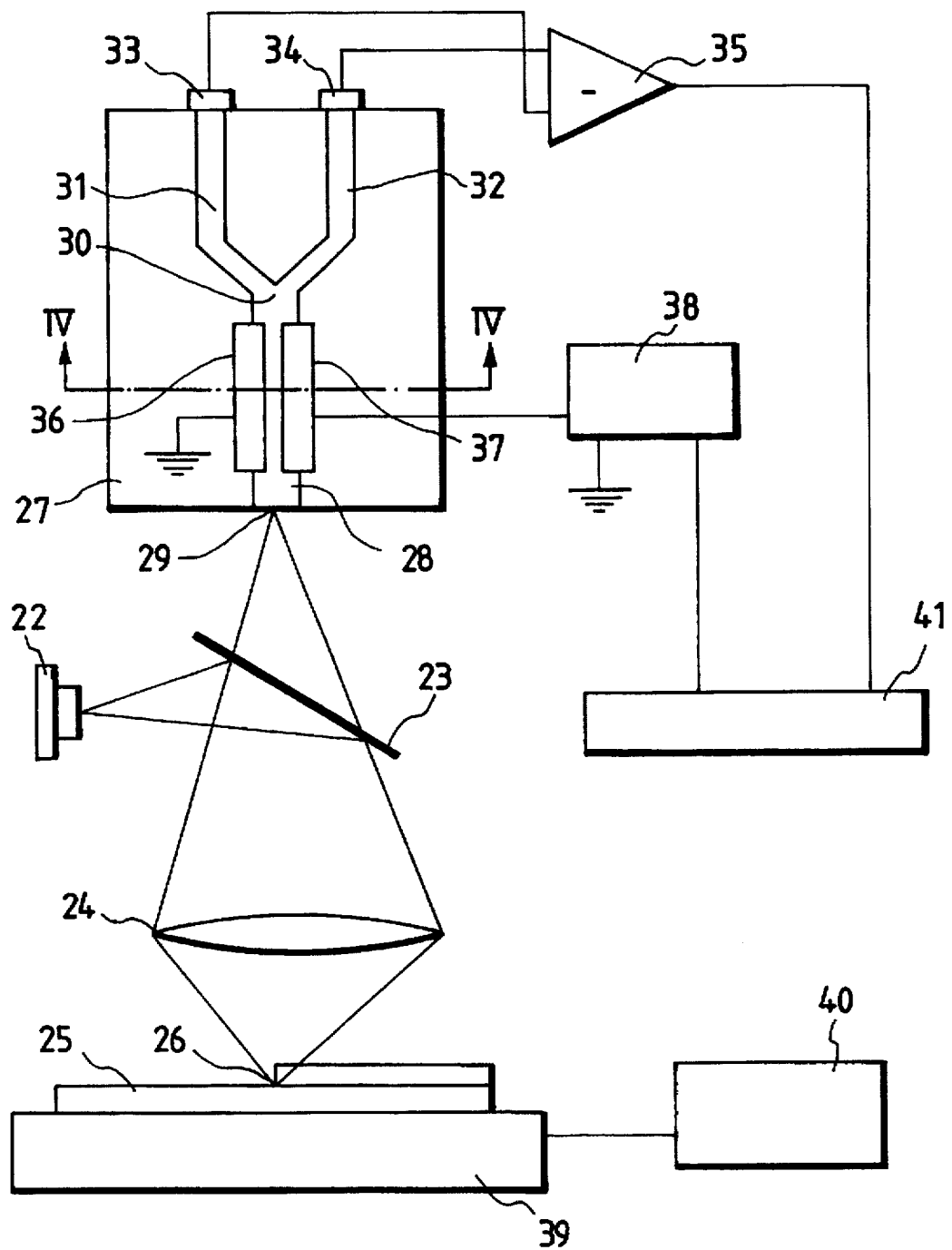
FIG. 3 is a schematic structural drawing to show a step measuring apparatus according to a second embodiment of the present invention.

FIG. 3 is a schematic structural diagram to show a minute step measuring apparatus according to the second embodiment of the present invention.

Figure 4:
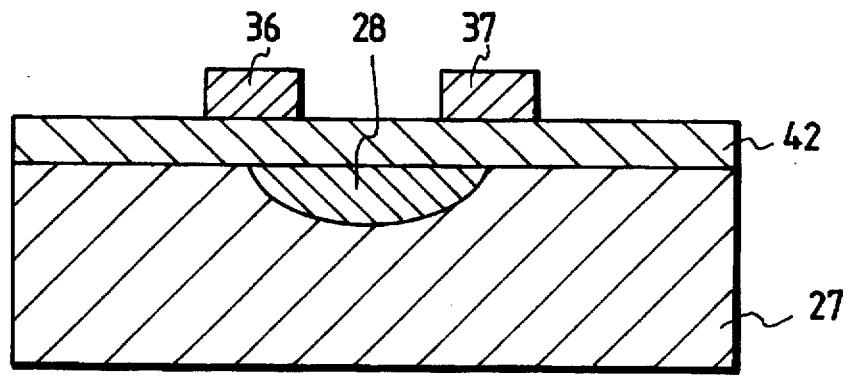
FIG. 4 is a cross section along IV—IV line in FIG. 3.

Laser light emitted from a laser light source 22 travels via a half mirror 23 and an objective lens 24 to form a light spot 26 on an object 25 to be measured. Return light (reflected light) from the object 25 travels again via the objective lens 24 and the half mirror 23 to enter an entrance end face 29 (detection surface) of a double-mode channel waveguide 28 formed on a substrate 27. The light entering the entrance end face 29 propagates in the double-mode channel waveguide 28 to be distributed into two channel waveguides 31, 32 at a waveguide branch region 30. For light beams distributed into the two channel waveguides 31, 32, intensities thereof are detected by respective photodetectors 33, 34. Outputs from the photodetectors 33, 34 are input into a subtractor 35 to obtain a difference signal between them. FIG. 4 shows a cross section when cut along line IV—IV in FIG. 3. As shown in FIG. 4, the double-mode channel waveguide 28 is formed on the substrate 27, and electrodes 36, 37 are formed above the substrate 27 through a buffer layer 42.

In the second embodiment, the double-mode channel waveguide 28 and two channel waveguides 31, 32 were fabricated by patterning and thermal diffusion of a metal, titanium, on a lithium niobate substrate 27 by conventional methods. In the double-mode region of the double-mode channel waveguide 28, the electrodes 36, 37, patterned in stripes of aluminum metal are provided through the buffer layer consisting of a thin film of silicon dioxide, and the output of a variable voltage supply 38 is connected to the electrodes. The length of the double-mode channel waveguide 28 is set to the same length as in the first embodiment. An effective double-mode length of the double-mode channel waveguide 28 can be changed by a voltage applied between the electrodes 36, 37, whereby the phase difference between the even mode and the odd mode can be changed at least in the range of from 0° to 90°. The object 25 is fixed on an X-Y movable stage 39, and the X-Y movable stage 39 is arranged so as to be capable of relatively moving the object 25 with respect to the light spot 26 by a control signal from a controller 40. A computer 41 monitors an output from the subtractor 35, changing with a change in the output voltage of the variable voltage supply 38, and calculates a height of a step structure on the object 25 using equation (21) from a voltage value of the variable voltage supply 38 when the contrast of a mode interference signal obtained by the subtractor 35 becomes maximum. A relation preliminarily obtained by experiment or computation was used as a relation between the output voltage of the variable voltage supply 38 and the phase difference α between the even and odd modes.

The object 25 used in the second embodiment is the same as the object 4 used in the first embodiment. In the second embodiment, the height of the step structure on the object 25, h, was also obtained as 157 nm.

In the second embodiment, the X-Y movable stage 39 was moved prior to measurement of step so that the step structure on the object 25 was located at the center of the light spot 26, thereby maximizing the absolute value of the mode interference signal obtained from the subtractor 35.

The second embodiment was explained as one to obtain the height of the object, but if a relative step on the object is desired to be measured as in the first embodiment, it can be achieved by monitoring the voltage value applied to the electrodes 36, 37, which is a value according to the step height.

Figure 5:
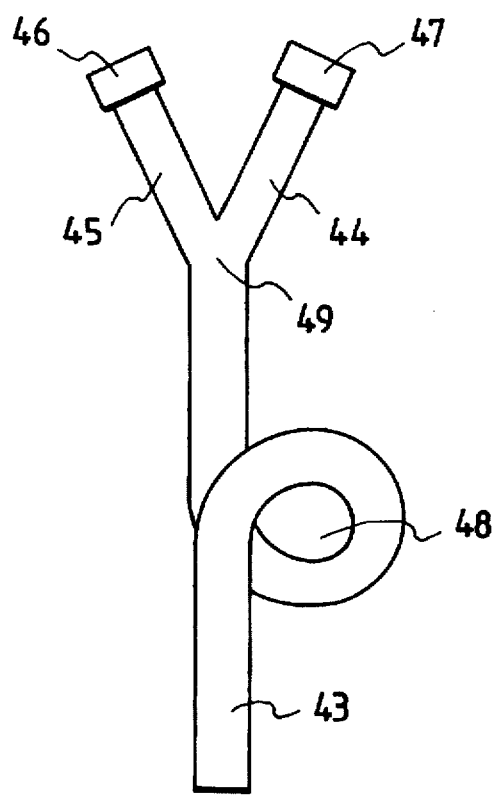
FIG. 5 is a schematic diagram to show another example of a channel waveguide applicable to the present invention.

Although the first and second embodiments employed the channel waveguides formed on the substrate as the double-mode channel waveguide and the two channel waveguides connected to the double-mode channel waveguide, they may be channel guides of optical fibers, as shown in FIG. 5. The structure shown in FIG. 5 corresponds to the various devices formed on the substrate 27 in FIG. 3, and the other constituents necessary for the minute step measuring apparatus are omitted because those in FIG. 3 can be applied as they are.

The double-mode channel waveguide 43 and single-mode channel waveguides 44, 45 shown in FIG. 5 all are optical fibers. Here, the single-mode channel waveguides 44, 45 do not have to be limited to those for letting light propagate in the single mode, but may be double-mode waveguides or multi-mode waveguides as long as they can allow light coming from the branch region 49 to propagate. Light beams emerging from the single-mode channel waveguides 44, 45 are detected by photodetectors 47, 46, respectively, such as photodiodes.

In FIG. 5, the double-mode channel waveguide 43 is wound around a piezoelectric device 48 a few times in order to make a fully coupled length of the double-mode region in the double-mode channel waveguide 43 variable, as in the second embodiment. Accordingly, the double-mode channel waveguide 43 can be mechanically expanded or contracted with application of a voltage to the piezoelectric device 48, whereby the effective double-mode length of the double-mode channel waveguide 43 can be changed similarly as in the second embodiment.

Those skilled in the art can selectively and properly use the optical fibers and the light waveguides formed in the substrate from FIG. 3 and FIG. 5. For example, a possible arrangement is such that the waveguide formed on the substrate is used for the double-mode channel waveguide and optical fibers are used for the channel waveguides connected to the double-mode channel waveguide.

Having described preferred embodiments of the present invention, it is to be understood that many variations will occur to those skilled in the art within the scope of the appended claims.

What is claimed is:

1. A minute step measurement method, comprising forming a laser spot on an object by condensing light from a laser light source, condensing light beams from said object on an end face of a double-mode waveguide, branching light propagating in said double-mode waveguide into two channel waveguides, detecting two light beams respectively emerging from said two channel waveguides, and measuring a minute step existing on said object, using at least one of a signal of a difference and a signal of a sum of two signals corresponding to said two light beams detected, wherein said measuring includes obtaining a signal $W_a$ of said sum when said laser spot is located on one of two flat portions at opposite sides of said step, and a signal $W_b$ of said sum when said laser spot is located on the other flat portion, and using said signals $W_a$ and $W_b$ in such a manner as to correct for a difference between reflectivities of the two flat portions.

2. A minute step measurement method according to claim 1, wherein an effective length L of said double-mode waveguide is defined by a length expressed by L=Lc (m+½), where Lc is a length whereby a phase difference between an even mode and an odd mode excited in said double-mode waveguide becomes π, and m is a positive integer.

3. A minute step measurement method, comprising forming a laser spot on an object by condensing light from a laser light source, condensing light beams from said object on an end face of a double-mode waveguide, branching light propagating in said double-mode waveguide into two channel waveguides, detecting two light beams respectively emerging from said two channel waveguides, and measuring a minute step existing on said object, using at least one of a signal of a difference and a signal of a sum of two signals corresponding to said two light beams detected, wherein when $W_a$ is a signal of said sum when said laser spot is located on one of two flat portions at opposite sides of said step, $W_b$ is a signal of said sum when said laser spot is located on the other flat portion, W is a signal of said sum when a center of said laser spot becomes coincident with a center of said step, S is a signal of said difference, and R is a constant determined depending upon a device, said measuring includes obtaining a phase difference $\phi$ in accordance with at least one of the following two equations:

$$\sin\phi = \frac{1}{R} \frac{S}{\sqrt{W_a}\sqrt{W_b}}$$

and $$\cos\phi = \frac{4W - (W_a + W_b)(1 + R^2)}{2\sqrt{W_a}\sqrt{W_b}(1 - R^2)}$$

4. A minute step measurement method according to claim 3, wherein an effective length L of said double-mode waveguide is defined by a length expressed by $L = Lc(m+\frac{1}{2})$, where Lc is a length whereby a phase difference between an even mode and an odd mode excited in said double-mode waveguide becomes $\pi$, and m is a positive integer.

5. A minute step measurement method, comprising forming a laser spot on an object by condensing light from a laser light source, condensing light beams from said object on an end face of a double-mode waveguide, branching light propagating in said double-mode waveguide into two channel waveguides, detecting two light beams respectively emerging from said two channel waveguides, and measuring a minute step existing on said object, using a signal of a difference of two signals corresponding to said two light beams detected, wherein said laser spot is formed on said object so that a center of said laser spot is located at a center of said step, a phase difference between an even mode and an odd mode excited in said double-mode waveguide is adjusted, and said step is measured based on an adjustment amount of said phase difference between the even mode and the odd mode when an absolute value of said signal of a difference becomes maximum or minimum.

6. A minute step measurement method according to claim 5, wherein said double-mode waveguide has an electrooptic effect, and with said laser spot formed on said object so that the center of said laser spot is located at the center of said step, an electric field is applied to said double-mode waveguide so that an absolute value of said signal of a difference becomes maximum or minimum, and said step is measured based on a corresponding value of said electric field.

7. A minute step measurement method, comprising forming a laser spot on an object by condensing light from a laser light source, condensing light beams from said object on an end face of a double-mode waveguide, branching light propagating in said double-mode waveguide into two channel waveguides, detecting two light beams respectively emerging from said two channel waveguides, and measuring a minute step existing on said object, using a composite signal of two signals corresponding to said two light beams detected, wherein said laser spot is formed on said object so that a center of said laser spot is located at a center of said step, a phase difference between an even mode and an odd mode excited in said double-mode waveguide is adjusted, and said step is measured based on an adjustment amount of said phase difference between the even mode and the odd mode when an absolute value of said composite signal becomes maximum or minimum.

8. A minute step measurement method according to claim 7, wherein said double-mode waveguide has an electrooptic effect, and with said laser spot formed on said object so that the center of said laser spot is located at the center of said step, an electric field is applied to said double-mode waveguide so that an absolute value of said composite signal becomes maximum or minimum, and said step is measured based on a corresponding value of said electric field.

* * * * *